Patented Oct. 14, 1930

1,778,548

UNITED STATES PATENT OFFICE

WILLIAM S. CALCOTT AND WILLIAM A. DOUGLASS, OF PENNS GROVE, NEW JERSEY, AND MILES A. DAHLEN, OF WILMINGTON, DELAWARE, ASSIGNORS TO E. I. DU PONT DE NEMOURS & COMPANY, OF WILMINGTON, DELAWARE, A CORPORATION OF DELAWARE

METHOD OF COMPOUNDING RUBBER

No Drawing.   Application filed June 13, 1929.   Serial No. 370,736.

This invention relates to a method of treating rubber and the resulting rubber product and is more particularly concerned with a method of treatment whereby a rubber product is obtained which is unusually resistant to deterioration and oxidation.

It is generally accepted that the rate of deterioration of rubber articles differs greatly depending on various factors such as the composition of the stock, the form of the article and the conditions under which it is used. Various materials have heretofore been incorporated in rubber stocks to inhibit deterioration. However, most of the agents heretofore employed for this purpose have been open to the objection that they discolor the rubber. For some purposes, such as white and light colored stocks it is essential that the rubber composition contain nothing which will cause discoloration of the cured stock even after exposure to direct sunlight.

The use of certain phenolic compounds to retard the deterioration of rubber has been suggested as, for example, in British Patents #181,365 and #142,083. In general, however, the phenolic compounds mentioned have a very great retarding effect upon vulcanization when the vulcanization is carried out in a press. For example, Pelizzola (Giorn. Chem. Ind. Applicata 6, (1924) 59–60) found that the addition of 1 part of pyrogallol to a mixture of 100 parts of rubber and 8 parts of sulfur increased the time required for vulcanization from 2 hours to 4 hours at 144° C. We have found that phenol, resorcinol, and hydroquinone also exert this effect of retarding the vulcanization with certain accelerators so that their use is not always practical.

The primary object of this invention therefore is to provide a method for retarding the deterioration of rubber by the use of materials which cause practically no subsequent discoloration by exposure to direct sunlight and which at the same time do not retard the cure.

With these objects in view, it has been discovered that compounds having the general formula HO—R—O—R'—Y wherein R and R' represent aryl or alkyl aryl hydrocarbon radicals, and Y represents H or OH, may be added to a rubber mix without affecting the rate of cure and that the resulting rubber when vulcanized has much greater resistance to deterioration than rubber containing no antioxidant. In addition, these materials cause no substantial discoloration even upon exposure to direct sunlight.

In order to disclose the invention in detail, the following examples of actual embodiments thereof are presented. It should be understood however that these examples are furnished purely for purposes of illustration and that it is not the intention that the invention be limited to the particular reagents, proportions or other conditions therein specified.

*Example 1.*—As an example of the compounds comprising the invention, para-hydroxy-diphenyl ether

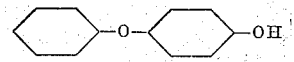

may be cited as one in which the aryl hydrocarbon radicals are connected together through oxygen and Y is H in the general formula given above.

Two stocks were made up of the following compositions; the proportions given are by weight:

|  | Stock A | Stock B |
|---|---|---|
| Smoked sheets | 100 | 100 |
| Sulfur | 2 | 2 |
| Titanox | 50 | 50 |
| ZnO | 3 | 3 |
| Tetra-methyl-thiuram-mono-sulfide | 0.2 | 0.2 |
| p-hydroxy-diphenyl-ether | | 1.0 |

The two stocks were cured at 20 lbs. steam pressure for 20 minutes. The cured samples were thereupon aged in an oxygen bomb at 70° C. under 300 lbs. of oxygen pressure. The time required for complete deterioration of the two stocks is indicated below:

For stock A_____ 7 days
For stock B_____ 19 days

It will be observed that the resistance to deterioration of the stock containing the antioxidant is 170% greater than that of the stock containing no antioxidant.

*Example 2.*—As an example of the general formula HO—R—O—R′—Y in which Y is OH, p-p′-dihydroxy-diphenyl-ether,

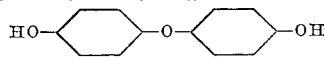

may be cited. This compound may also be designated as 4-4′-dihydroxy diphenyl ether. Stocks were made up and subjected to aging tests as indicated in Example 1. A similar increase in the resistance of the stock to deterioration was observed.

It is often advantageous to treat vulcanized rubber with reagents to improve the aging characteristics. The group of compounds described above is particularly useful for this purpose. In general, an antioxidant is dissolved in a solvent and the cured stock is then immersed in the solution. After sufficient time has elapsed to permit the desired degree of absorption, the solvent is removed in an evacuated desiccator, or in some other manner.

In tests of this type it has been found that the time required for complete deterioration has been increased from 6 days (for the untreated stock) to from 21–25 days (for the treated stock). This increase represents more than 200% increase in the age resistance of the rubber.

In addition to the compounds mentioned above, the following compounds may be mentioned as among those tested and found to have comparable antioxidant properties:

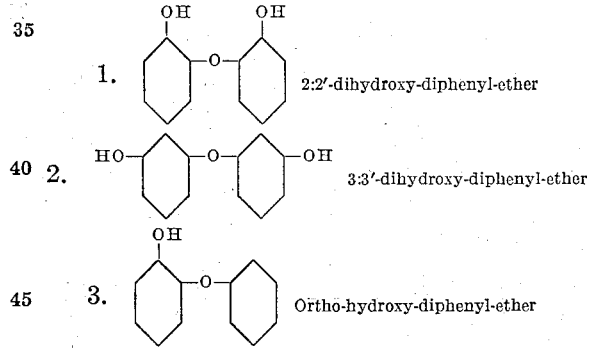

Moreover, it is obvious that instead of the phenyl groups of the compounds disclosed in the examples, naphthyl groups may be substituted and also that phenyl-naphthyl ethers are embraced within the scope of the invention.

Many other compounds falling within this general class could be named, the above being listed merely by way of example. It is obvious that compounds of the type described may contain alkyl substituents in the aryl groups which substituents would have very little effect upon the properties of the particular compound.

The antioxidants may be incorporated into the rubber by any well known means, such as milling them into the stock upon the rolls of an ordinary mill. Moreover, they may be employed in various rubber compounds and rubber substitutes such as, for example, gutta-percha, balata and synthetic rubber, and it is therefore to be understood that the invention is not limited to any particular rubber stock or rubber compound. Also, the proportions of the antioxidant employed may be varied within wide limits although under ordinary circumstances about 1% of the antioxidant based on the weight of the stock treated has been found to be highly satisfactory.

As many apparent and widely different embodiments of this invention may be made without departing from the spirit thereof, it is to be understood that we do not limit ourselves to the foregoing examples or description except as indicated in the following claims.

We claim:

1. The process of increasing the resistance of rubber to deterioration due to aging which comprises incorporating with the rubber an antioxidant having the general formula HO—R—O—R′—Y wherein R and R′ represent aryl radicals, and Y represents H or OH.

2. The process of claim 1 wherein, in the formula of the antioxidant employed, at least one of the groups R and R′ is a phenyl group.

3. The process of claim 1 wherein, in the formula of the antioxidant employed, the groups R and R′ are both phenyl groups.

4. In the art of vulcanizing rubber, the step of mixing with the unvulcanized rubber a vulcanizing agent and an antioxidant having the general formula

HO—R—O—R′—Y (wherein R and R′ represent aryl radicals and Y represents H or OH) and thereafter vulcanizing.

5. The process of claim 4 wherein, in the formula of the antioxidant employed, Y represents H.

6. The process of claim 4 wherein, in the formula of the antioxidant employed, Y represents H and R and R′ represent phenyl groups.

7. The process of claim 1 wherein the antioxidant employed is represented by the formula

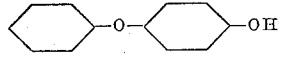

8. Rubber having incorporated therewith an antioxidant of the type set forth in claim 1.

9. Rubber having incorporated therewith an antioxidant of the type set forth in claim 7.

10. Vulcanized rubber obtained by incorporating with the rubber prior to vulcanization a vulcanizing agent and an antioxidant having the general formula

HO—R—O—R′—Y wherein R and R′ represent aryl radicals, and

Y represents H or OH, and thereafter vulcanizing.

11. Vulcanized rubber obtained by incorporating with the rubber prior to vulcanization a vulcanizing agent and an antioxidant having the general formula $$HO-R-O-R'-Y$$

(wherein R and R' represent phenyl groups, and Y represents H or OH) and thereafter vulcanizing.

12. Vulcanized rubber obtained by incorporating with the rubber prior to vulcanization a vulcanizing agent and an antioxidant having the formula

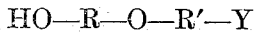

and thereafter vulcanizing.

13. The process of claim 1, wherein the antioxidant employed is represented by the formula

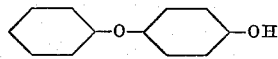

14. The process of claim 1, wherein the antioxidant employed is represented by the formula

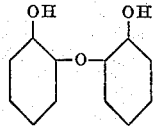

15. Vulcanized rubber obtained by incorporating with the rubber prior to vulcanization a vulcanizing agent and an antioxidant having the formula

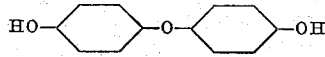

and thereafter vulcanizing.

16. Vulcanized rubber obtained by incorporating with the rubber prior to vulcanization a vulcanizing agent and an antioxidant having the formula

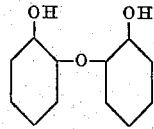

and thereafter vulcanizing.

In testimony whereof we affix our signatures.

WILLIAM S. CALCOTT.
WILLIAM A. DOUGLASS.
MILES A. DAHLEN.